(12) United States Patent
Tornberg

(10) Patent No.: US 7,611,175 B2
(45) Date of Patent: Nov. 3, 2009

(54) BUMPER BEAM FOR A VEHICLE

(75) Inventor: Simon Tornberg, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 426 days.

(21) Appl. No.: 10/589,925

(22) PCT Filed: Feb. 17, 2005

(86) PCT No.: PCT/SE2005/000211

§ 371 (c)(1),
(2), (4) Date: Aug. 18, 2006

(87) PCT Pub. No.: WO2005/080141

PCT Pub. Date: Sep. 1, 2005

(65) Prior Publication Data

US 2007/0176438 A1 Aug. 2, 2007

(30) Foreign Application Priority Data

Feb. 25, 2004 (SE) .................................... 0400435

(51) Int. Cl.
*B60R 19/04* (2006.01)
(52) U.S. Cl. ........................ 293/102; 293/121; 293/122
(58) Field of Classification Search ................ 293/102, 293/120, 122, 121; 296/187.09, 187.11; D12/163, 167, 169
See application file for complete search history.

(56) References Cited

U.S. PATENT DOCUMENTS 4,714,287 A 12/1987 Merkle
6,398,275 B1 * 6/2002 Hartel et al. ................. 293/102
6,435,579 B1 8/2002 Glance
6,481,690 B2 * 11/2002 Kariatsumari et al. ....... 293/155
6,726,261 B2 * 4/2004 Goto et al. ................... 293/120
6,814,380 B2 * 11/2004 Yoshida et al. .............. 293/120
7,108,303 B2 * 9/2006 Bladow et al. .............. 293/122
7,316,432 B2 * 1/2008 Muskos ...................... 293/102
7,407,219 B2 * 8/2008 Glasgow et al. ........ 296/187.03
2002/0047281 A1 * 4/2002 Hartel et al. ................. 293/102
2003/0047952 A1 * 3/2003 Trappe ........................ 293/120
2003/0218341 A1 11/2003 Jonsson et al.
2003/0227182 A1 * 12/2003 Yoshida et al. .............. 293/102
2004/0007886 A1 * 1/2004 Hallergren ................... 293/102
2006/0028032 A1 * 2/2006 Henseleit ..................... 293/102
2006/0125254 A1 * 6/2006 Arns et al. ................... 293/155
2007/0102942 A1 * 5/2007 Muskos ...................... 293/102
2007/0257497 A1 * 11/2007 Heatherington et al. ..... 293/120

FOREIGN PATENT DOCUMENTS

DE 19509541 9/1996
DE 10143532 3/2003
EP 1291247 3/2003

* cited by examiner

*Primary Examiner*—Jason S Morrow
(74) *Attorney, Agent, or Firm*—Mark P. Stone

(57) ABSTRACT

A bumper beam has a bow-formed outer profile (14), that has a central flange (16) and two webs (15, 18) and is fastened in two crash boxes (12, 13) with its central flange facing away from the crashboxes. The outer profile has a cover (15) so that the bumper beam will have a closed profile. The cover (15) has a central flange (24) and two webs (25, 26). The webs (17, 18) of the outer profile (14) are joined in pairs with the webs (25, 26) of the cover (15), and the web height of the cover at its center is bigger than the web height of the outer profile (14) at its center.

24 Claims, 2 Drawing Sheets

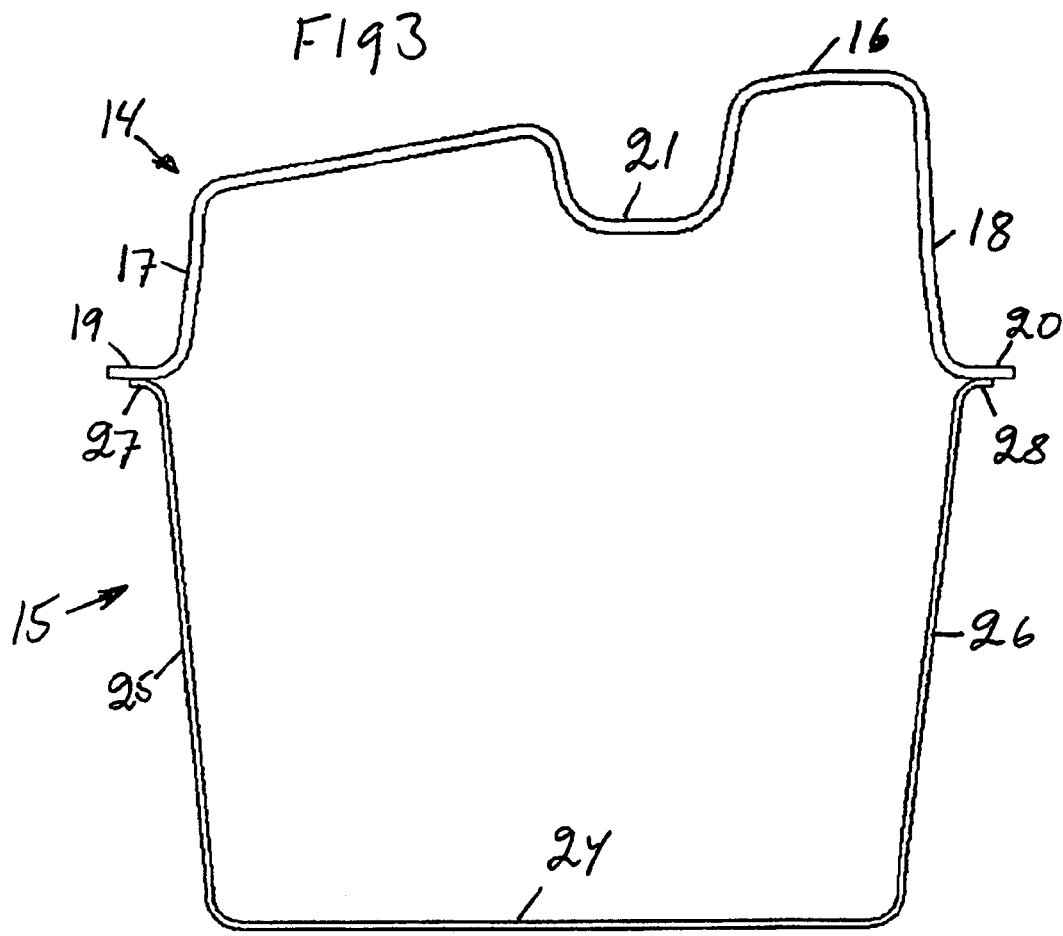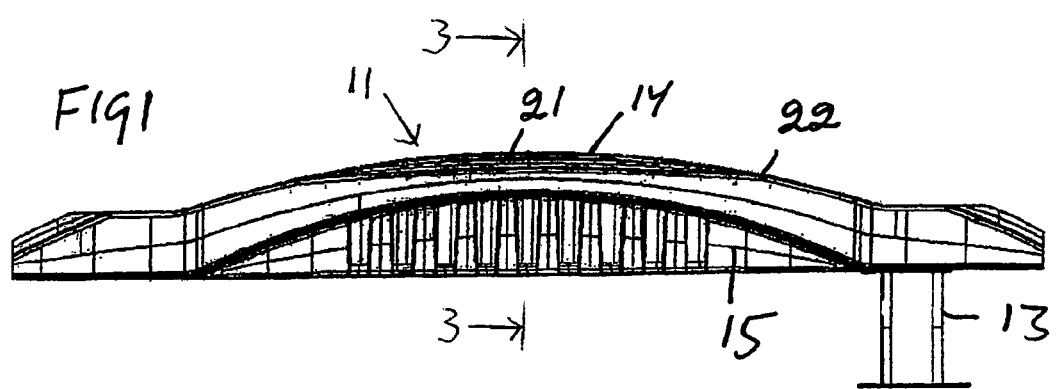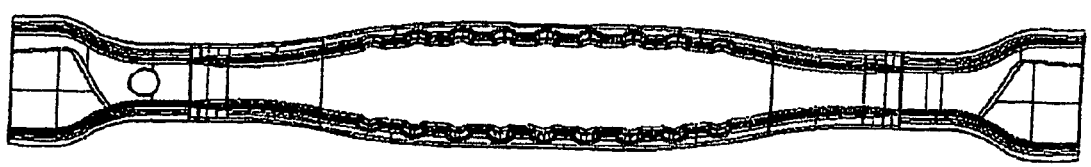

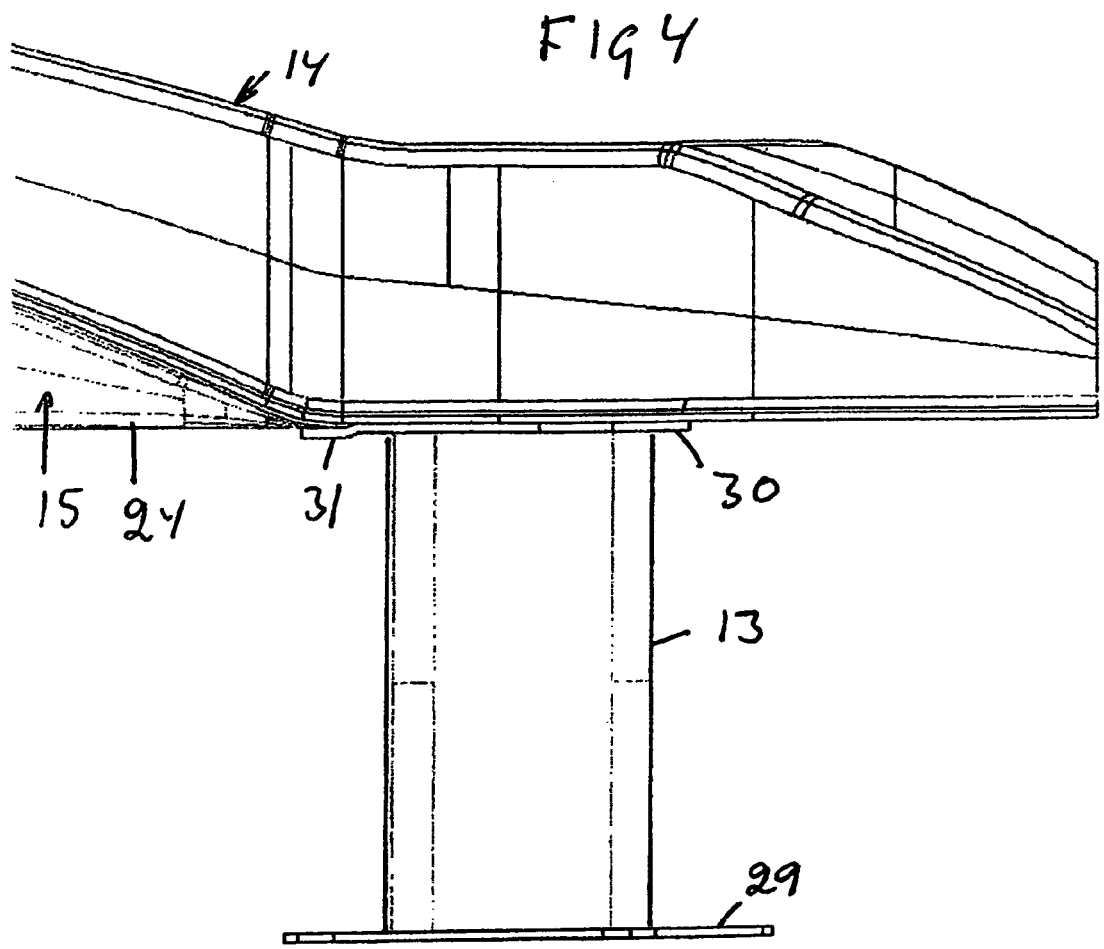
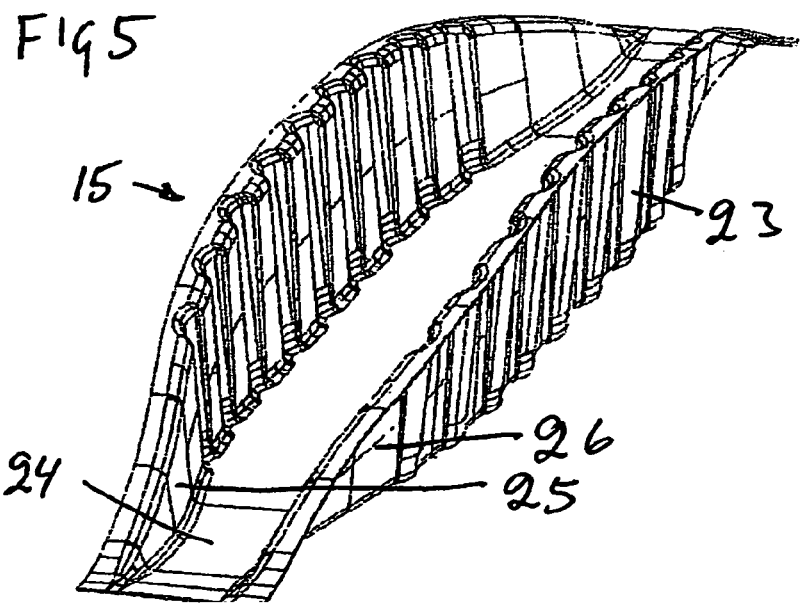

BUMPER BEAM FOR A VEHICLE

The present application is the U.S. National Phase of International Patent Application PCT/SE 05/000211, filed Feb. 17, 2005, pursuant to 35 USC 363.

TECHNICAL AREA

The invention relates to a bumper beam for a vehicle, comprising an outer profile with a bow-formed central flange and two webs and a cover that provides a closed profile, the outer profile being adapted to be fastened with its central flange facing outwards from the vehicle.

BACKGROUND OF THE INVENTION

A bumper beam that has good properties for various kinds of barrier crashes may be bad for a collision with a pole at a low velocity. One of the most common accidents involving a rear bumper beam, for example, is the crash against a lamp post on a parking lot. In particular when the bumper beam is fastened in crash boxes that are weak sideways, the bumper beam will collapse locally and fold.

OBJECT OF INVENTION

It is an object of the invention to provide a bumper beam that has good performance generally and also good performance in a low velocity crash against a pole. This is achieved when the cover has central flange and two webs, and the webs of the cover are coupled in pairs with the webs of the outer profile, the web height of the cover at its centre being greater than the web height of the outer profile at its centre.

BRIEF DESCRIPTION OF THE DRAWINGS

FIG. 1 is a top view of a bumper beam.
FIG. 2 is a side view of the same bumper beam as seen from inside the vehicle.
FIG. 3 is a section taken along line 3-3 in FIG. 1.
FIG. 4 is an enlargement of a portion of FIG. 1.
FIG. 5 is a perspective view of one of the part that make up the bumper beam of the preceding figures.

DESCRIPTION OF THE ILLUSTRATED AND PREFERRED EXAMPLE OF THE INVENTION

FIG. 1 shows, as seen from above, a bumper beam 11 of steel symmetrically fastened in two crash boxes 13, only one of which being illustrated and only schematically. The bumper beam is made up of an outer profile in the form of a bow-formed beam 14 and a cover 15. The outer profile is a hat profile as shown in FIG. 3 with a central flange 16 and two webs 17, 18 that end in side flanges 19, 20. The central profile of the central flange may have a longitudinal stiffener 21, the depth of which decreases from its centre so that it ends at 22. The cover 15 is also in the form of a hat profile with a central flange 24 and two webs 25, 26 that end in side flanges 27, 28. The webs of the two hat beams are united by welds. The webs can be directly welded together or alternatively, they can be united by having their side flanges 19, 20,; 27,28 welded together as illustrated. As can be seen in FIG. 3, the sheet thickness of the cover is less than the sheet thickness of the outer profile. The steel of the cover may also have lower yield strength than the steel of the outer profile. The outer profile can suitably be press-hardened, that is, hot stamped and hardened in the same tools in one operation, whereas the cover can suitably be cold formed from cold-forming sheet steel. The outer profile may have a sheet thickness of 2 mm and a yield strength of about 1150 MPa or more, whereas the cover may have a considerably less sheet thickness and a yield strength of less than ¾ of the yield strength of the outer profile, for example about half the strength. The sheet thickness of the cover may suitably be at most ¾ of the thickness of the outer profile.

The cover, that is, the inner profile, is shown in perspective as FIG. 5. Its webs 25, 26 have transverse stiffeners 23 and the height of the webs reduces continuously so that the cover ends as a flat sheet.

As best shown in FIG. 4, the crash boxes 13 have a fastening plate 29 with holes for screws so that they can be screwed to a supporting portion of the vehicle. They have a fastening plate 30 as well in which the outer profile is fastened, preferably being welded thereto. The plate 30 has a portion 31, which is bent outwards and under which the flat end of the cover extends and is welded to the portion 31 so that tension forces can be transmitted between the plate 30 and the cover. Alternatively, the cover may extend under the entire plate 30 and be welded both to the plate and to the outer profile. In both cases, the outer profile 14 is fastened in the crash boxes, either directly or indirectly with the cover inbetween. Since the cover may be made of comparatively thin sheet, its fastening to the crash boxes may be too weak in the absence of the plate 30 and such a plate 30 is therefore preferred.

The central flange 24 of the cover has linear extension between the crash boxes, and the depth of the bumper beam at its middle is larger than its depth at its fastening portions. The depth relation should be at least 130% or rather at least 160%. The central flange 24 of the cover takes the tension load when the outer profile hits for example a post and it reduces the risk of local collapsing of the outer panel 14. Instead of collapsing, the bumper beam will have a dent. If the tension load would not be taken up, the outer profile 14 would tend to straighten out and bend the crash boxes outwards. At a high collision load, the crash boxes would bend outwards from each other and then, they would not deform as intended and could therefore not take up energy as intended. The central flange of the cover need not be exactly linear in order to take up tension load well. It should, however, be substantially linear, and bow form with a pitch of a few cm has a minor effect on the capability of taking up tension load.

The depth of the outer profile increases continuously from the centre of the bumper beam towards the fastening portions, which provides for a weight reduction and a cost reduction since, without disadvantage, the cover can have a thinner sheet thickness and lower strength than the outer profile. The strength of the cover calculated as a combination of yield strength of the material and the sheet thickness may be less than half the corresponding strength of the outer profile. The stiffener 23 or corrugation of the webs 25, 25 of the cover reduces the risk of the webs collapsing.

The invention claimed is:

1. A bumper beam for a vehicle, comprising an outer profile (14) with a bow-shaped central flange (16) and two webs (17, 18), and a cover (15) that provides a closed profile, the outer profile being adapted to be fastened with an outer surface of said bow-shaped central flange facing outwards from the vehicle, characterised in that
the cover (15) has a central flange (24) and two webs (25, 26), and the two webs (25, 26) of the cover are coupled in pairs with the two webs (17, 18) of the outer profile (14), the web height of the cover (15) at its center being greater than the web height of the outer profile (14) at its center, the web height of the outer profile (14) increasing continuously sideways from its center, and the web height of the cover (15) decreasing continuously sideways from its center.

2. A bumper beam according to claim 1, characterised in that the combined web height of the outer profile and the cover of the bumper beam at its center is at least 130% of the combined web height of the outer profile and the cover of the bumper beam at fastening portions thereof, and the central flange (24) of the cover extends substantially linearly between said fastening portions.

3. A bumper beam according to claim 2, characterised in that the combined web height of the outer profile and the cover is at least 160% of the combined web height of the outer profile and the cover at said fastening portions.

4. A bumper beam according to claim 1, characterised in that the webs of the cover have transverse stiffeners (23) which are oriented in a direction transverse to the direction of longitudinal extension of the webs of the cover.

5. A bumper beam according to claim 1, characterised in that the outer profile (14) and the cover (15) are welded together.

6. A bumper beam according to claim 5, characterised in that both the outer profile (14) and the cover (15) have side flanges that end their webs, and these side flanges (19 and 27; 20 and 28) are welded together.

7. A bumper beam for a vehicle, comprising an outer profile (14) with a bow-shaped central flange (16) and two webs (17, 18), and a cover (15) that provides a closed profile, the outer profile being adapted to be fastened with an outer surface of said bow-shaped central flange facing outwards from the vehicle, characterised in that the cover (15) has a central flange (24) and two webs (25, 26), and the two webs (25, 26) of the cover are coupled in pairs with the two webs (17, 18) of the outer profile (14), the web height of the cover (15) at its center being greater than the web height of the outer profile (14) at its center, and the cover has a lower yield strength than the outer profile.

8. A bumper beam for a vehicle, comprising an outer profile (14) with a bow-shaped central flange (16) and two webs (17, 18), and a cover (15) that provides a closed profile, the outer profile being adapted to be fastened with an outer surface of said bow-shaped central flange facing outwards from the vehicle, characterised in that the cover (15) has a central flange (24) and two webs (25, 26), and the two webs (25, 26) of the cover are coupled in pairs with the two webs (17, 18) of the outer profile (14), the web height of the cover (15) at its center being greater than the web height of the outer profile (14) at its center, the thickness of the material from which the cover (15) is formed is less than the thickness of the material from which the outer profile (14) is formed.

9. A bumper beam according to claim 2, characterised in that the webs of the cover have transverse stiffeners (23) which are oriented in a direction transverse to the direction of longitudinal extension of the webs of the cover.

10. A bumper beam according to claim 3, characterised in that the webs of the cover have transverse stiffeners (23) which are oriented in a direction transverse to the direction of longitudinal extension of the webs of the cover.

11. A bumper beam according to claim 2, characterised in that the outer profile (14) and the cover (15) are welded together.

12. A bumper beam according to claim 3, characterised in that the outer profile (14) and the cover (15) are welded together.

13. A bumper beam according to claim 4, characterised in that the outer profile (14) and the cover are welded together.

14. A bumper beam according to claim 7, characterised in that the thickness of the material from which the cover (15) is formed is less than the thickness of the material from which the outer profile (14) is formed.

15. A bumper beam according to claim 8, characterised in that the cover has a lower yield strength than the outer profile.

16. A bumper beam according to claim 7, characterised in that the combined web height of the outer profile and the cover of the bumper beam at its center is at least 130% of the combined web height of the outer profile and the cover of the bumper beam at fastening portions thereof, and the central flange (24) of the cover extends substantially linearly between said fastening portions.

17. A bumper beam according to claim 8, characterised in that the combined web height of the outer profile and the cover of the bumper beam at its center is at least 130% of the combined web height of the outer profile and the cover of the bumper beam at fastening portions thereof, and the central flange (24) of the cover extends substantially linearly between said fastening portions.

18. A bumper beam according to claim 7, characterised in that the webs of the cover have transverse stiffeners (23) which are oriented in a direction transverse to the direction of longitudinal extension of the webs of the cover.

19. A bumper beam according to claim 8, characterised in that the webs of the cover have transverse stiffeners (23) which are oriented in a direction transverse to the direction of longitudinal extension of the webs of the cover.

20. A bumper beam according to claim 7, characterised in that the outer profile (14) and the cover (15) are welded together.

21. A bumper beam for a vehicle, comprising an outer profile (14) with a bow-shaped central flange (16) and two webs (17, 18), and a cover (15) that provides a closed profile, the outer profile being adapted to be fastened with a outer surface of said bow-shaped central flange facing outwards from the vehicle, said outer profile having a predetermined web height, and said cover having a predetermined web height, characterised in that the web height of the outer profile (14) increases continuously sideways from its center, and the web height of the cover (15) decrease continuously sideways from its center.

22. A bumper beam according to claim 1, characterised in that said outer profile (14) includes a stiffener (21) extending in a longitudinal direction along a portion of said outer profile (14).

23. A bumper beam according to claim 7, characterised in that said outer profile (14) includes a stiffener (21) extending in a longitudinal direction along a portion of said outer profile (14).

24. A bumper beam according to claim 8, characterised in that said outer profile (14) includes a stiffener (21) extending in a longitudinal direction along a portion of said outer profile (14).

* * * * *

UNITED STATES PATENT AND TRADEMARK OFFICE
CERTIFICATE OF CORRECTION

PATENT NO. : 7,611,175 B2
APPLICATION NO. : 10/589925
DATED : November 3, 2009
INVENTOR(S) : Simon Tornberg It is certified that error appears in the above-identified patent and that said Letters Patent is hereby corrected as shown below:

Column 3, Line 54 (Claim 8, Line 13): After "center,", add --and--.

Column 4, Line 43 (Claim 21, Line 4): Delete "a", and substitute --an--.

Signed and Sealed this

Fifth Day of January, 2010

David J. Kappos
*Director of the United States Patent and Trademark Office*